United States Patent
Ishide et al.

(10) Patent No.: US 6,172,323 B1
(45) Date of Patent: Jan. 9, 2001

(54) COMBINED LASER AND PLASMA ARC WELDING MACHINE

(75) Inventors: Takashi Ishide; Yoshio Hashimoto; Haruo Shirata, all of Takasago; Katsusuke Shimizu, Tokyo, all of (JP)

(73) Assignee: Mitsubishi Heavy Industries, Ltd., Tokyo (JP)

(*) Notice: Under 35 U.S.C. 154(b), the term of this patent shall be extended for 0 days.

(21) Appl. No.: 09/126,741

(22) Filed: Jul. 31, 1998

(51) Int. Cl.[7] ............................. B23K 10/00; B23K 26/00
(52) U.S. Cl. ......................... 219/121.5; 219/121.45; 219/121.39; 219/121.48; 219/121.63
(58) Field of Search ................. 219/121.63, 121.64, 219/121.65, 121.66, 121, 84, 121.45, 121.46, 121.39, 121.44, 121.48, 121.5, 74, 75

(56) References Cited

U.S. PATENT DOCUMENTS

| | | | |
|---|---|---|---|
| 4,377,735 | * 3/1983 | Minamida et al. | 219/121.84 |
| 4,689,466 | * 8/1987 | Hoshinouchi et al. | 219/121.84 |
| 4,782,205 | * 11/1988 | Shira | 219/74 |
| 5,247,155 | * 9/1993 | Steen et al. | 219/121.83 |
| 5,700,989 | 12/1997 | Dykhno et al. | |
| 5,821,493 | * 10/1998 | Beyer et al. | 219/121.46 |
| 5,866,870 | * 2/1999 | Walduck | 219/121.45 |

FOREIGN PATENT DOCUMENTS

| | | |
|---|---|---|
| 0129603A1 | 1/1985 | (EP). |
| 0844042A1 | 5/1998 | (EP). |
| 54-39340 | 3/1979 | (JP). |
| 9-122950A | 5/1997 | (JP). |

* cited by examiner

Primary Examiner—Mark Paschall

(57) ABSTRACT

Focused laser light and plasma arc are coaxially disposed to provide a laser machining head which performs a high precision and efficient machining, by reinforcing laser light with plasma arc to form a versatile heat source. For this purpose, in a tip part 6 of a laser machining head 10 having optical systems 4 and 5 for focusing a laser light 11 oscillated by a laser oscillator 1, a plasma machining head 20 is mounted coaxially with the optical systems 4 and 5. The plasma machining head 20 is provided with electrode nozzles 24 and 25 connected to a plasma apparatus 15 and a working gas supply passage 19 connected to the electrode nozzles 24 and 25 so that the laser light 11 and a plasma arc 28 are irradiated towards a same machining position 14 of a machined part 13.

9 Claims, 1 Drawing Sheet

COMBINED LASER AND PLASMA ARC WELDING MACHINE

BACKGROUND OF THE INVENTION

The present invention relates to a laser machining head, more specifically to a laser machining head suitable for welding steel products and the like, and for thermal machining such as cutting, gouging, spraying, and the like.

Laser machining makes possible, a machining of a very high precision, since input energy density is higher than $10^2$ to $10^4$ kJ/s-cm$^2$ and laser light can be focused to the machined part using an appropriate optical system. Therefore, a laser machining head having such functions has heretofore been used in thermal machining such as cutting, grouging, spraying, and the like.

On the other hand, in plasma machining, when an electrical voltage is applied between electrodes to generate an arc and a working gas is fed in the periphery thereof, the working gas is ionized to produce a plasma as an electroconductive gas mixture of ions and electrons, The input energy density is about $(0.5$ to $1) \times 10^2$ kJ/s-cm$^2$. A plasma machining head, generating such a plasma, has been used for welding, cutting, and other thermal machining.

Plasma welding is a welding performed by using heat of plasma arc, and includes a plasma arc welding utilizing a transfer arc and a plasma jet welding, in which high temperature, high-speed gas flow is generated by a non-transfer arc, and welding is performed by the heat.

In general, in laser machining, a laser machining head is used alone, and similarly in plasma machining, a plasma machining head is used alone, to perform thermal machining such as welding, cutting, or gouging.

However, the above-described prior art laser machining head or plasma machining head had the following problems. Specifically, when laser welding is performed by the prior art laser machining head, welding groove targeting tolerance, that is, tolerable range when the laser beam comes out from the welding groove target line (allowance including tolerable error) is narrow. Further, when welding is performed by using an inert gas for the purpose of oxidation prevention of the welded part or preventing adherence of impurities, a porosity is generated in the welded part.

Further, when cutting is performed by using the above prior art laser machining head, plate thickness, which can be cut by a laser, is about 12 mm for a carbon dioxide ($CO_2$) gas laser, and about 4 to 6 mm for a YAG (yttrium-aluminum garnet) laser, and cutting of steel products of greater plate thicknesses has been difficult. Therefore, it has been inferior to the plasma cutting.

On the other hand, when welding is performed by using the prior art plasma machining head, the plasma arc tends to fluctuate with insufficient stability. Therefore, tolerance of machining condition is narrow, and high precision welding is thus impossible. Furthermore, plate thickness, which is possible for 1-pass welding has been only about 3 to 4 mm.

A primary object of the present invention, is to solve the above prior art problems, and to provide a laser machining head, in which focused laser light and plasma arc are coaxially disposed to reinforce laser light with plasma arc to form a versatile heat source, thereby enabling high precision, stable, and efficient machining.

SUMMARY OF THE INVENTION

In the present invention, laser light and plasma arc are driven complementarily to each other to give the laser light general-purpose functions by reinforcing with the plasma arc. For this purpose, in a tip part of a laser machining head having an optical system for focusing a laser beam outputted from a laser oscillator to a machining position of a machined material, a plasma machining head having an electrode nozzle, connected to a plasma power source and a plasma generator for generating plasma gas by the electrode nozzle from a working gas supplied from a working gas supply passage, is provided nearly coaxially with the optical system.

Further, in the present invention, to make high precision, stable, and efficient machining possible, the electrode nozzle and the plasma generator are disposed along focusing shape of the laser beam, thereby irradiating plasma arc towards the same position as the focusing position of the laser beam.

Still further, a cathode nozzle and an anode nozzle, as electrode nozzles, are disposed along the focusing shape of the laser beam, and the plasma generator is disposed between the electrode nozzles.

Yet further, electrode nozzles are disposed on the periphery of the laser beam along the focusing shape of the laser beam, and the plasma generator is disposed on the periphery of the laser beam.

Yet further, a tip of the electrode nozzle and a tip of the plasma generator are formed to face a space at a tip of focusing position of the laser beam.

DETAILED DESCRIPTION OF PREFERRED EMBODIMENT

Laser Oscillator

Figure 1:
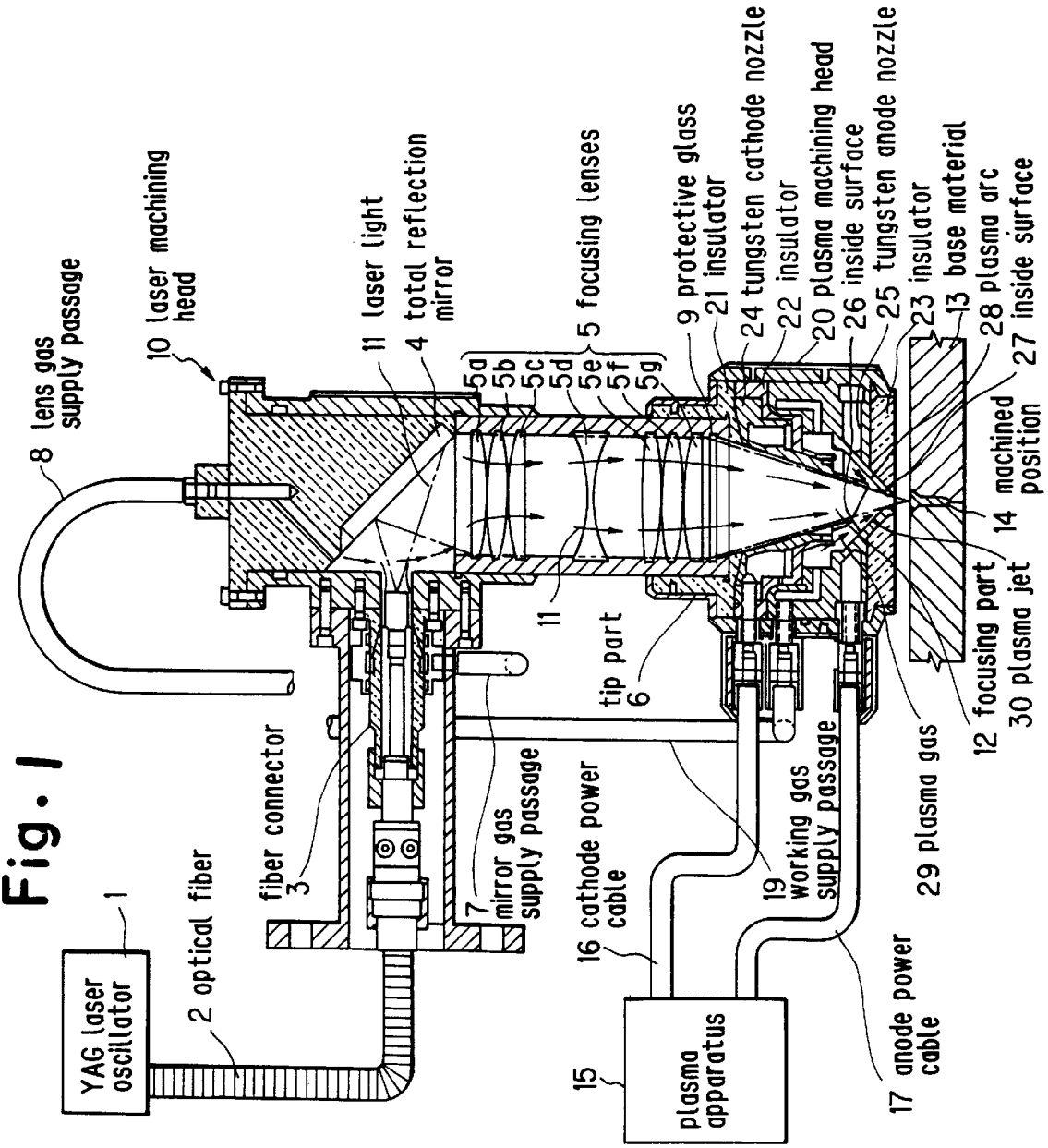
FIG. 1 is a schematic sectional diagram showing an embodiment of the laser machining head according to the present invention.

Laser oscillator of the present invention for exciting an active substance to obtain a laser beam of high energy density is preferably a YAG laser or a carbon dioxide laser using YAG or carbon dioxide as an active substance. In addition, a ruby laser, an excimer laser, and others can be used.

Optical System

Optical system is preferably one which is provided with an optical system comprising a combination of a deflection mirror and a number of positive and negative focusing lenses, however, a concave mirror and a convex mirror may be combined to focus laser light without using a lens system.

Plasma Apparatus

Plasma apparatus is preferably of a plasma jet type, which generates an arc (main arc) between an electrode and a nozzle to be used as a heat source. However, it is of course possible to use a plasma arc type.

Electrode Nozzle

Electrode nozzle is mounted coaxially with the above-described optical system to generate an arc, and a working gas fed in between is ionized by heat of the arc to produce a plasma which is an electroconductive gas as a mixture of ions and electrons. The electrode nozzle is preferably a combination of a tungsten cathode with a tungsten or copper anode. However, it is needless to say that the electrode materials are not limited to the above and the anode and cathode can be made of appropriate materials.

Working Gas

Working gas is preferably an inert gas, such as argon or helium, which becomes plasma ions as described above. However, it is also possible to select the working gas from such gases as hydrogen, nitrogen, and air.

When the laser machining head of the present invention is used, since laser light and plasma jet are coaxially irradiated, the plasma jet is stabilized by generation of laser excited plasma by laser light. Then, laser light is reinforced with the plasma jet to become an extended heat source, as a result, porosity generated when using only laser welding is eliminated, thereby achieving high precision and strong machining such as welding, cutting, gouging, and the like.

In the following, the present invention will be exemplificatively described in detail with reference to the drawing. However, dimensions, material, shape, and relative positions of components described in this embodiment are given by way of illustration only unless otherwise specified, and thus are not intended to be limitative of the present invention.

FIG. 1 shows the laser machining head, as reference numeral 10, according to an embodiment of the present invention. The laser machining head 10 is connected to a YAG laser oscillator 1, as a laser oscillator, through an optical fiber 2 and a fiber connector 3.

Further, the laser machining head 10 incorporates a focusing lens optical system comprising a total reflection mirror 4, as an optical system, and focusing lenses 5a to 5g, and opens to a tip part 6. Still further, a protective glass 9 is mounted at an end of the opening. Yet further, a mirror gas (argon gas) supply passage 7 for cooling the total reflection mirror 4 and a lens gas supply passage 8 for cooling the focusing lenses 5a to 5g are provided on the laser machining head 10.

On the other hand, a plasma machining head 20 for plasma arc generation is mounted to the tip part 6 of the laser machining head 10, coaxially with the laser machining head 10. Further, the plasma machining head 20 is connected to a cathode power cable 16 and an anode power cable 17 which are connected to a plasma apparatus 15.

The cathode power cable 16 and the anode power cable 17 are connected, respectively, to a tungsten cathode nozzle 24 and a tungsten anode nozzle 25 through insulators 21, 22, and 23 incorporated in the plasma machining head 20. Tips of the tungsten cathode nozzle 24 and the tungsten anode nozzle 25 are opened towards a machined position 14 of a base material 13 to be machined, and inside surfaces 26 and 27 of the tungsten cathode nozzle 24 and the tungsten anode nozzle 25 form a focusing part 12 of laser light 11, opposing the machined position 14 of the base material 13.

Further, a working gas supply passage 19 for supplying a plasma gas as a working gas opens between the tungsten cathode nozzle 24 and the tungsten anode nozzle 25.

Next, operation of the laser machining head 10 according to the embodiment of the present invention will be described with reference to a case in which the base material 13, as the machined material, is welded. First, the laser light 11 generated and oscillated by the YAG laser oscillator 1 is conducted to the laser machining head 10 through the optical fiber 2 and the fiber connector 3. Then, the laser light 11 is refracted by the total reflection mirror 4 and guided to a focusing lens optical system 5. The respective lenses 5a to 5g of the focusing lens optical system 5 focus the refracted laser light 11 at the machined position 14 of the base material 13.

On the other hand, in the plasma machining head 20, power is supplied to the tungsten cathode nozzle 24 and the tungsten anode nozzle 25 from the plasma apparatus 15 through the cathode power cable 16 and the anode power cable 17 to generate a plasma arc 28 between both tungsten electrode nozzles 24 and 25. Then, plasma gas (specifically argon gas) 29 is fed as a turning flow from the working gas supply passage 19 to surround the plasma arc.

Then, the plasma gas 29 is ionized by heat of the plasma arc 28 to be a high temperature plasma as an electroconductive gas which is a mixture of ions and electrons, and a high temperature plasma jet 30 at about $(2 \text{ to } 3) \times 10^4 \text{K}$ blows out from between the tungsten cathode nozzle 24 and the tungsten anode nozzle 25. At this moment, the focused laser light 11 and the plasma jet 30 are focused and irradiated to the machined position 14 of the base material 13 to rapidly heat and melt the machined position 14 of the base material 13, thus achieving high speed welding. With the present embodiment, high speed welding of up to a maximum of 2 m/min is possible.

With the present embodiment, even when high speed welding is carried out, the focused laser light 11 and the plasma jet 30 are focused and irradiated to the machined position of the base material 13 so that the laser light 11 generates a laser induced plasma, the laser induced plasma stably conducts the plasma jet 30, thereby achieving stable welding without waving of the plasma jet 30. As a result, allowance of the welding groove targeting accuracy is greater than the case with laser light alone. Further, with the laser machining apparatus according to the present embodiment, plate thickness weldable by 1-pass welding is 10 mm with the YAG laser of the present embodiment with a substantially deep melting, compared to 3 to 4 mm with prior art plasma welding.

Still further, lens gas 8 and mirror gas 7 make shielding of the machined position 14 as the welded part of the base material 13 during welding, while cooling the total reflection mirror 4 and the focusing lens system 5. Since a protective glass 9 is located at the tip side of the focusing lens system 5, dust due to fume or spatter generated during welding adheres to the protective glass 9 but does not adhere to the lens 5, thereby protecting the lens 5 from staining. When the protective glass 9 is excessively stained, it is cleaned or replaced.

Yet further, when making laser cutting of a steel product using the laser machining head 10 according to the present embodiment, a plate thickness of up to 30 to 60 mm can be cut at a high speed at a cutting speed of 1000 mm/min which has been impossible with laser light alone, and generation of dross (slug) is suppressed by the plasma jet 30, thereby achieving high speed cutting.

As described above, with the laser machining head according to the present invention, since the laser machining head is mounted coaxially with the optical system provided on the laser machining head at the tip of the laser machining head to irradiate laser light and plasma jet towards the same machined part, advantages of laser light and plasma arc can be utilized, thereby providing the following effects.

a) Allowance of the welding groove targeting accuracy can be increased to the same level as ordinary welding.

b) Possibility of high speed welding as one of advantages of laser welding is remarkably increased compared to laser welding alone.

c) Various types of thermal machining such as laser cutting and laser welding can be performed by the same head, and, according to the article to be machined, with, the machining head unchanged, it can be selectively used according to the applications such as laser cutting, plasma cutting, and the like.

d) Even when an inert gas is used in laser welding, generation of undesirable porosity can be suppressed.

e) Cutting of thick plate is possible which is impossible with laser light alone.

What is claimed is:

1. A machining head, comprising:
   a laser machining head having an optical system for focusing a laser beam outputted from a laser oscillator to a machining position of a workpiece; and
   a plasma machining head having a pair of electrode nozzles, connected to a plasma power source, for generating a plasma arc, and a plasma generator for converting a plasma gas, supplied from a working gas supply passage, into a plasma jet by the plasma arc, said plasma machining head being provided substantially coaxial with said optical system at a lower end portion of said laser machining head, said pair of electrode nozzles being disposed inside a housing and insulated by an insulator.

2. The machining head as claimed in claim 1, wherein said pair of electrode nozzles and said plasma generator are disposed along a focusing shape of the laser beam, such that the plasma jet is irradiated towards the same focusing point of said laser beam.

3. The machining head as claimed in claim 2, wherein a cathode nozzle and an anode nozzle, as said pair of electrode nozzles, are disposed along the focusing shape of said laser beam, and said plasma generator is disposed between said electrode nozzles.

4. The machining head as claimed in claim 2, wherein said pair of electrode nozzles are disposed on the periphery of said laser beam along the focusing shape of said laser beam, and said plasma generator is disposed on the periphery of said laser beam.

5. The machining head as claimed in claim 2, wherein a lower end of one of said pair of electrode nozzles and a lower end of said plasma generator are provided spaced apart from a focusing point of said laser beam.

6. The machining head as claimed in claim 3, wherein said pair of electrode nozzles are disposed on the periphery of said laser beam along the focusing shape of said laser beam, and said plasma generator is disposed on the periphery of said laser beam.

7. The machining head as claimed in claim 3, wherein a lower end of one of said pair of electrode nozzles and a lower end of said plasma generator are provided spaced apart from a focusing point of said laser beam.

8. The machining head as claimed in claim 4, wherein a lower end of one of said pair of electrode nozzles and a lower end of said plasma generator are provided spaced apart from a focusing point of said laser beam.

9. The machining head as claimed in claim 1, wherein said plasma gas is supplied as a turning flow to surround the plasma arc.

* * * * *